US012808024B2

(12) United States Patent
Kwon et al.

(10) Patent No.: US 12,808,024 B2
(45) Date of Patent: Nov. 24, 2026

(54) NON-ORIENTED ELECTRICAL STEEL SHEET AND MOTOR CORE COMPRISING SAME

(71) Applicant: POSCO CO., LTD, Pohang-si (KR)

(72) Inventors: Soobin Kwon, Pohang-si (KR); Yunsu Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 215 days.

(21) Appl. No.: 18/722,296

(22) PCT Filed: Dec. 21, 2022

(86) PCT No.: PCT/KR2022/020963
§ 371 (c)(1),
(2) Date: Jul. 24, 2024

(87) PCT Pub. No.: WO2023/121294
PCT Pub. Date: Jun. 29, 2023

(65) Prior Publication Data
US 2025/0066892 A1 Feb. 27, 2025

(30) Foreign Application Priority Data
Dec. 22, 2021 (KR) ........................ 10-2021-0184608

(51) Int. Cl.
*H02K 1/02* (2006.01)
*C21D 1/30* (2006.01)
(Continued)

(52) U.S. Cl.
CPC ................ *C22C 38/60* (2013.01); *C21D 1/30* (2013.01); *C21D 6/008* (2013.01); *C21D 8/1222* (2013.01);
(Continued)

(58) Field of Classification Search
CPC ..... C22C 38/60; C22C 38/001; C22C 38/002; C22C 38/008; C22C 38/02; C22C 38/04;
(Continued)

(56) References Cited

U.S. PATENT DOCUMENTS

2020/0040423 A1 2/2020 Natori et al.
2020/0083788 A1 3/2020 Zhu et al.
2022/0195570 A1* 6/2022 Miyamoto .............. C22C 38/14

FOREIGN PATENT DOCUMENTS

CN 112080694 A 12/2020
EP 3875614 A1 9/2021
(Continued)

OTHER PUBLICATIONS

Japanese Office Action dated Sep. 30, 2025 issued in Japanese Patent Application No. 2024-538215.
(Continued)

*Primary Examiner* — Thomas Truong
(74) *Attorney, Agent, or Firm* — Morgan Lewis & Bockius LLP

(57) ABSTRACT

A non-oriented electrical steel sheet includes a steel sheet base material and an insulation film on the steel sheet base material. The steel sheet base material includes, by wt %, 2.0 to 6.5% Si, 0.1 to 1.3% Al, 0.3 to 2.0% Mn, more than 0 to 0.03% Sn, more than 0 to 0.02% Sb, and a balance of Fe and inevitable impurities, and satisfies Formula 1: 0.030≥[Sn]+[Sb]≥0.005. The non-oriented electrical steel sheet satisfies Formula 2: 0.1≥[Mn film]/[Mn50] before stress relief annealing and Formula 3: 10≥[Mn film]/[Mn50]≥1 after stress relief annealing, wherein [Sn] and [Sb] are contents, in wt %, of Sn and Sb, [Mn film] is an average Mn amount in the insulation film, and [Mn50] is a Mn amount at a depth of 50 μm from an interface toward an inside of the steel sheet base material.

15 Claims, 1 Drawing Sheet

100

(51) Int. Cl.

| | |
|---|---|
| ***C21D 6/00*** | (2006.01) |
| ***C21D 8/1216*** | (2026.01) |
| ***C21D 8/1244*** | (2026.01) |
| ***C21D 8/1277*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/12*** | (2006.01) |
| ***C22C 38/14*** | (2006.01) |
| ***C22C 38/60*** | (2006.01) |

(52) U.S. Cl.

CPC ......... *C21D 8/1233* (2013.01); *C21D 8/1261* (2013.01); *C21D 8/1283* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *H02K 1/02* (2013.01); *C22C 2202/02* (2013.01)

(58) Field of Classification Search

CPC ......... C22C 38/06; C22C 38/12; C22C 38/14; C22C 2202/02; C22C 38/004; C22C 38/16; C21D 1/30; C21D 6/008; C21D 8/1222; C21D 8/1233; C21D 8/1261; C21D 8/1283; C21D 9/46; C21D 1/76; C21D 7/06; C21D 8/1272; C21D 8/1277; H02K 1/02; H02K 15/02; C23C 22/20; C23C 22/74; C23C 22/18; H01F 1/14791; H01F 1/18; H01F 1/147

See application file for complete search history.

(56) References Cited

FOREIGN PATENT DOCUMENTS

| | | | |
|---|---|---|---|
| JP | H06-60347 | B2 | 8/1994 |
| JP | H09-20966 | A | 1/1997 |
| JP | 2000-129409 | A | 5/2000 |
| JP | 2005-118902 | A | 5/2005 |
| JP | 2006-161094 | A | 6/2006 |
| JP | 2011-168824 | A | 9/2011 |
| JP | 2013-144825 | A | 7/2013 |
| JP | 2020-090720 | A | 6/2020 |
| JP | WO2020/090160 | A1 | 2/2021 |
| JP | 2021-036075 | A | 3/2021 |
| JP | 2021-038458 | A | 3/2021 |
| KR | 10-2019-0003783 | | 1/2019 |
| KR | 10-2019-0118611 | A | 10/2019 |
| KR | 10-2020-0066494 | A | 6/2020 |
| WO | 2017/111548 | A1 | 6/2017 |
| WO | 2018/025941 | A1 | 2/2018 |
| WO | 2021/117325 | A1 | 6/2021 |

OTHER PUBLICATIONS

The Extended European Search Report dated Sep. 29, 2025 issued in European Patent Application No. 22911927.6.

International Search Report and Written Opinion dated Mar. 24, 2023 issued in International Patent Application No. PCT/KR2022/020963 (with English translation).

* cited by examiner

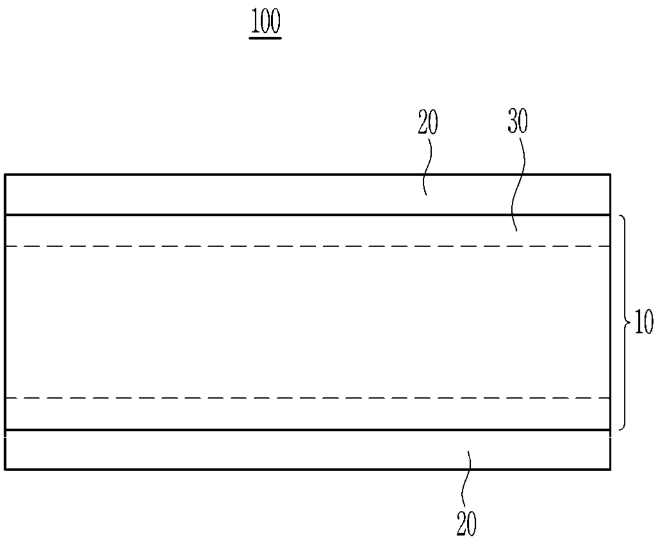
100
20
30
10
20

NON-ORIENTED ELECTRICAL STEEL SHEET AND MOTOR CORE COMPRISING SAME

CROSS-REFERENCE OF RELATED APPLICATIONS

This application is the U.S. National Phase under 35 U.S.C. § 371 of International Patent Application No. PCT/KR2022/020963, filed on Dec. 21, 2022, which in turn claims the benefit of Korean Application No. 10-2021-0184608, filed on Dec. 22, 2021, the disclosures of which applications are incorporated by reference herein.

TECHNICAL FIELD

An embodiment of the present disclosure relates to a non-oriented electrical steel sheet and a motor core including the same. Specifically, an embodiment of the present disclosure relates to a non-oriented electrical steel sheet which has improved adhesiveness of an insulating coating film by appropriately adjusting contents of Sn and Sb and increasing a shot ball projection amount when removing scale to prevent Mn diffusion into an insulating coating film during stress relief annealing, and a motor core including the same.

BACKGROUND ART

A non-oriented electrical steel sheet is mainly used in a motor which converts electrical energy into mechanical energy, and in order to exhibit high efficiency in this process, the non-oriented electrical steel sheet is required to have excellent magnetic properties. In particular, in recent years, as environmentally-friendly technology has been gaining attention, it is considered to be very important to increase the efficiency of motors, which accounts for more than a half of total electrical energy consumption, and to this end, the demand for a non-oriented electrical steel sheet having excellent magnetic properties is also increasing.

The magnetic properties of the non-oriented electrical steel sheet is mainly evaluated by iron loss and magnetic flux density.

Iron loss refers to energy loss occurring at certain magnetic flux density and frequency, and magnetic flux density refers to a magnetization degree obtained under the certain magnetic field. As the iron loss is lower, a motor having higher energy efficiency may be manufactured under the same conditions, and as the magnetic flux density is higher, the motor may be miniaturized or copper loss may be decreased. Thus, it is important to manufacture a non-oriented electrical steel sheet having low iron loss and high magnetic flux density.

The characteristics of the non-oriented electrical steel sheet to be considered also vary depending on the operation conditions of the motor. As a criterion for evaluating the characteristics of the non-oriented electrical steel sheet to be used in the motor, W15/50 which is iron loss when a 1.5 T magnetic field is applied to a plurality of motors at a commercial frequency of 50 Hz is considered to be the most important. However, the W15/50 iron loss is not considered to be the most important in all motors of various uses, and iron loss at another frequency or applied magnetic field is also evaluated depending on main operation conditions. In particular, in the non-oriented electrical steel sheet used in a drive motor of the recent electric vehicles, since magnetic properties are often important at a low magnetic field of 1.0 T or less and a high frequency of 400 Hz or more, the characteristics of the non-oriented electrical steel sheet are evaluated by iron loss such as W10/400.

In order to manufacture products such as a motor or a transformer from the non-oriented electrical steel sheet, the non-oriented electrical steel sheet should be slit into a specific shape. In this process, stress is imparted to the non-oriented electrical steel sheet, and in order to remove the stress, stress relief annealing is performed.

In the stress relief annealing process, a Mn component in the steel sheet diffuses into an insulating coating film, which becomes the cause of decreased adhesiveness between the steel sheet and the insulating coating film. Though there was an attempt to suppress diffusion of Mn by adding Sb and Sn and adjusting a content relationship between Al and Mn, the attempt had limitations. Suppression of diffusion of Mn through formation of a surface oxide layer and a surface segregation element layer had little effect, which results in weakening of a binding force between an insulating coating and a base material.

DISCLOSURE

Technical Problem

The present disclosure attempts to provide a non-oriented electrical steel sheet and a motor core including the same. Specifically, the present disclosure attempts to provide a non-oriented electrical steel sheet having improved adhesiveness of an insulating coating film, by appropriately adjusting contents of Sn and Sb and appropriately adjusting a shot ball projection amount when removing scale of a hot rolled sheet to prevent Mn diffusion into the insulating coating film during stress relief annealing, and a motor core including the same.

Technical Solution

An exemplary embodiment of the present disclosure provides a non-oriented electrical steel sheet including: a steel sheet base material which includes, by weight: 2.0 to 6.5% of Si, 0.1 to 1.3% of Al, 0.3 to 2.0% of Mn, 0.03% or less (excluding 0%) of Sn, and 0.02% or less (excluding 0%) of Sb, with a balance of Fe and other inevitable impurities and satisfies the following Formula 1, and an insulating coating film positioned on the steel sheet base material, wherein the non-oriented electrical steel sheet satisfies the following Formula 2 before stress relief annealing and satisfies the following Formula 3 after stress relief annealing:

$$0.030 \geq [Sn] + [Sb] \geq 0.005 \quad \text{[Formula 1]}$$

$$0.1 \geq [\text{Mn coating film}]/[\text{Mn50}] \quad \text{[Formula 2]}$$

$$10 \geq [\text{Mn coating film}]/[\text{Mn50}] \geq 1 \quad \text{[Formula 3]}$$

wherein [Sn] and [Sb] are contents of Sn and Sb, respectively, [Mn coating film] is an average Mn content (wt %) in the insulating coating film, and [Mn50] is a Mn content (wt %) at a depth of 50 μm from an interface between the steel sheet base material and the insulating coating film toward the inside of the steel sheet base material.

The steel sheet base material may further include 0.005 wt % or less of one or more of C, N, S, Ti, Nb, and V.

The steel sheet base material may further include one or more of 0.01 to 0.2 wt % of Cu, 0.100 wt % or less of P, 0.002 wt % or less of B, 0.01 wt % or less of Mo, 0.005 wt % or less of Mg, and 0.005 wt % or less of Zr.

An average crystal grain particle diameter before the stress relief annealing may be 60 μm or less.

Iron loss W10/800 (W/kg) after the stress relief annealing may satisfy the following Equation 4:

$$W10/800 \leq 25 + 60 \times t \quad \text{[Formula 4]}$$

wherein t is a thickness (mm) of the steel sheet.

The stress relief annealing may be performed at a temperature of 800 °C to 900 °C under an atmosphere which includes one or more of nitrogen, hydrogen, and carbon monoxide and has a dew point of 0 °C or lower.

Another exemplary embodiment of the present disclosure provides a method for manufacturing a non-oriented electrical steel sheet includes: hot rolling a slab which includes, by weight: 2.0 to 6.5% of Si, 0.1 to 1.3% of Al, 0.3 to 2.0% of Mn, 0.03% or less (excluding 0%) of Sn, and 0.02% or less (excluding 0%) of Sb, with a balance of Fe and other inevitable impurities and satisfies the following Formula 1, thereby manufacturing a hot rolled sheet; removing scale present on a surface of the hot rolled sheet; cold rolling the descaled hot rolled sheet to manufacture a cold rolled sheet; and annealing the cold rolled sheet, wherein the removing of scale includes projecting shot balls in an amount of 15 to 35 kg/(min·m$^2$) onto the steel sheet to remove scale.

$$0.030 \geq [Sn] + [Sb] \geq 0.005 \quad \text{[Formula 1]}$$

wherein [Sn] and [Sb] are contents (wt %) of Sn and Sb, respectively.

The shot balls may have an average particle size of 0.1 to 1 mm, and may be projected for 1 to 60 seconds.

A material of the shot balls may be a Fe-based alloy.

The annealing of the cold rolled sheet annealing may be performed at a temperature of 700 °C to 1100 °C for 10 to 1000 seconds.

Before the removing of scale, annealing of the hot rolled sheet may be further included.

After the annealing of the cold rolled sheet, stress relief annealing may be further included.

The stress relief annealing may be performed at a temperature of 800 °C to 900 °C under an atmosphere which includes one or more of nitrogen, hydrogen, and carbon monoxide and has a dew point of 0 °C or lower.

Still another exemplary embodiment of the present disclosure provides a motor core including: a rotor formed by laminating a plurality of non-oriented electrical steel sheets and a stator formed by laminating a plurality of non-oriented electrical steel sheets, wherein the non-oriented electrical steel sheet in the rotor includes, by weight: 2.0 to 6.5% of Si, 0.1 to 1.3% of Al, 0.3 to 2.0% of Mn, 0.03% or less (excluding 0%) of Sn, and 0.02% or less (excluding 0%) of Sb, with a balance of Fe and other inevitable impurities, and satisfies the following Formulae 1 and 2, and the non-oriented electrical steel sheet in the stator includes, by weight: 2.0 to 6.5% of Si, 0.1 to 1.3% of Al, 0.3 to 2.0% of Mn, 0.03% or less (excluding 0%) of Sn, and 0.02% or less (excluding 0%) of Sb, with a balance of Fe and other inevitable impurities, and satisfies the following Formulae 1 to 3:

$$0.030 \geq [Sn] + [Sb] \geq 0.005 \quad \text{[Formula 1]}$$

$$0.1 \geq [\text{Mn coating film}]/[\text{Mn50}] \quad \text{[Formula 2]}$$

$$10 \geq [\text{Mn coating film}]/[\text{Mn50}] \geq 1 \quad \text{[Formula 3]}$$

wherein [Sn] and [Sb] are contents of Sn and Sb, respectively, [Mn coating film] is an average Mn content (wt %) in the insulating coating film, and [Mn50] is a Mn content (wt %) at a depth of 50 μm from an interface between the steel sheet base material and the insulating coating film toward the inside of the steel sheet base material.

The non-oriented electrical steel sheets included in the stator and the rotor may be a non-oriented electrical steel sheet derived from the same coil.

A difference in contents of Si, Al, and Mn between the non-oriented electrical steel sheets included in the stator and the rotor may be 0.20 wt % or less.

Advantageous Effects

According to an exemplary embodiment, Sn and Sb are included in a specific range and a shot ball projection amount when removing scale is appropriately adjusted, thereby preventing a Mn component included in a steel sheet base material from diffusing into an insulating coating film during a process of stress relief annealing, so that a binding force between the insulating coating film and the steel sheet base material is maintained.

Thus, performance of motors for environmentally-friendly cars, motors for high-efficiency appliances, and super premium grade motors may be further improved by stress relief annealing.

DESCRIPTION OF THE DRAWINGS

FIG. 1 is a schematic diagram of a cross-section of a non-oriented electrical steel sheet according to an exemplary embodiment of the present disclosure.

MODE FOR INVENTION

The terms such as first, second, and third are used for describing various parts, components, areas, layers, and/or sections, but are not limited thereto. These terms are used only for distinguishing one part, component, area, layer, or section from other parts, components, areas, layers, or sections. Therefore, a first part, component, area, layer, or section described below may be mentioned as a second part, component, area, layer, or section without departing from the scope of the present disclosure.

The terminology used herein is only for mentioning a certain example, and is not intended to limit the present disclosure. Singular forms used herein also include plural forms unless otherwise stated clearly to the contrary. The meaning of “comprising” used in the specification is embodying certain characteristics, areas, integers, steps, operations, elements, and/or components, but is not excluding the presence or addition of other characteristics, areas, integers, steps, operations, elements, and/or components.

In the present specification, when it is mentioned that a part is “on” or “above” the other part, it means that the part is directly on or above the other part or another part may be interposed therebetween. In contrast, when it is mentioned that a part is "directly on" the other part, it means that nothing is interposed therebetween.

In addition, unless otherwise particularly described, % refers to wt %, and 1 ppm refers to 0.0001 wt %.

In an exemplary embodiment of the present disclosure, the meaning of further inclusion of an additional element is replacing iron (Fe) as a balance by the addition amount.

Though not defined otherwise, all terms including technical terms and scientific terms used herein have the same meaning as commonly understood by a person with ordinary skill in the art to which the present disclosure pertains. Terms defined in commonly used dictionaries are further interpreted as having a meaning consistent with the related technical literatures and the currently disclosed description, and unless otherwise defined, they are not interpreted as having an ideal or very formal meaning.

Hereinafter, an exemplary embodiment of the present disclosure will be described in detail so that a person with ordinary skill in the art to which the present disclosure pertains may easily carry out the present disclosure. As those skilled in the art would realize, the described embodiments may be modified in various different ways, all without departing from the spirit or scope of the present disclosure.

FIG. 1 schematically shows a cross-section of a non-oriented electrical steel sheet according to an exemplary embodiment of the present disclosure. As shown in FIG. 1, a non-oriented electrical steel sheet 100 includes a steel sheet base material 10 and an insulating coating film 20 positioned on a surface of the steel sheet base material 10. In the steel sheet base material 10, there may be a surface portion 30 formed from the surface toward the inside of the base material.

The steel sheet base material 10 according to an exemplary embodiment of the present disclosure includes, by weight: 2.0 to 6.5% of Si, 0.1 to 1.3% of Al, 0.3 to 2.0% of Mn, 0.03% or less (excluding 0%) of Sn, and 0.02% or less (excluding 0%) of Sb, with a balance of Fe and other inevitable impurities.

Hereinafter, the reasons for limiting components of the steel sheet base material 10 will be described first.

Si: 2.0 to 6.5 wt %

Silicon (Si) serves to lower iron loss by increasing the resistivity of a material, and if it is added too little, a high-frequency iron loss improvement effect may be insufficient. On the contrary, if it is added too much, hardness of a material is increased to extremely deteriorate cold rolling properties, so that productivity and blanking properties may become poor. Therefore, Si may be added in the range described above. More specifically, it may be included at 2.0 to 5.0 wt %. More specifically, it may be included at 3.0 to 4.0 wt %.

Al: 0.1 to 1.3 wt %

Aluminum (Al) serves to lower iron loss by increasing the resistivity of a material. When it is added too little, it is not effective in reducing high-frequency iron loss and a nitride may be finely formed to deteriorate magnetism. On the contrary, when it is added too much, problems are caused in all processes such as steel making and continuous casting, thereby greatly reducing productivity. Therefore, Al may be added in the range described above. More specifically, it may be included at 0.5 to 1.2 wt %. More specifically, it may be included at 0.7 to 1.0 wt %.

Mn: 0.3 to 2.0 wt %

Manganese (Mn) is an element which serves to improve iron loss by increasing the resistivity of a material and form a sulfide. When Mn is added too little, a sulfide may be finely precipitated to deteriorate magnetism. On the contrary, when Mn is added too much, formation of {111} texture which is unfavorable to magnetism may be promoted so that magnetic flux density may be decreased. Thus, Mn may be added in the range described above. More specifically, Mn may be included at 0.5 to 1.5 wt %.

In an exemplary embodiment of the present disclosure, resistivity may be 55 to 80 μΩ·cm.

Sn: 0.03 wt % or Less and Sb: 0.02 wt % or Less

Tin (Sn) and antimony (Sb) are added to a crystal grain boundary as segregation elements for suppressing diffusion of nitrogen through the crystal grain boundary, suppressing {111} texture which is unfavorable to magnetism, and increasing favorable {100} texture to improve magnetic properties. When Sn and Sb are added too much, respectively, crystal grain growth is hindered to deteriorate magnetism and rolling properties. Therefore, Sn and Sb may be added in the range described above. More specifically, 0.005 to 0.050 wt % of Sn and 0.005 to 0.050 wt % of Sb may be included. More specifically, 0.01 to 0.02 wt % of Sn and 0.01 to 0.02 wt % of Sb may be included.

Sn and Sb may satisfy the following Formula 1:

$$0.030 \geq [Sn] + [Sb] \geq 0.005 \quad \text{[Formula 1]}$$

wherein [Sn] and [Sb] are contents (wt %) of Sn and Sb, respectively.

In an exemplary embodiment of the present disclosure, Sn or Sb is concentrated on the steel sheet surface portion 30, and during stress relief annealing, diffusion of Mn from the steel sheet surface portion 30 to the insulating coating film 20 may be prevented. When the sum of Sn and Sn is less than 0.005 wt % or less, a large amount of Mn is diffused into the insulating coating film 20, resulting in poor adhesiveness. On the contrary, when Sn and Sb are included too much also, Mn is strongly prevented from diffusing into the insulating coating film 20, resulting in poor adhesiveness. More specifically, the value of Formula 1 may be 0.010 to 0.025.

The steel sheet base material 10 may further include one or more of 0.01 to 0.2 wt % of Cu, 0.100 wt % or less of P, 0.002 wt % or less of B, 0.01 wt % of less of Mo, 0.005 wt % or less of Mg, and 0.005 wt % or less of Zr.

Cu: 0.01 to 0.20 wt %

Copper (Cu) serves to form a sulfide with Mn. When Cu is further added, if it is added too little, CuMnS may be finely precipitated to deteriorate magnetism. If Cu is added too much, high temperature brittleness may occur to form cracks during soft casting or hot rolling. More specifically, Cu may be further included at 0.05 to 0.10 wt %.

P: 0.100 wt % or Less

Since phosphorus (P) serves to increase the resistivity of a material and also is segregated in a grain boundary to improve texture to increase the resistivity and lower iron loss, it may be further added. However, when the amount of P added is too much, formation of texture which is unfavorable to magnetism is caused so that there is no effect of texture improvement, and P is excessively segregated in the grain boundary to deteriorate rollability and workability, which makes production difficult. Therefore, P may be added in the range described above. More specifically, P may be included at 0.001 to 0.090 wt %. More specifically, P may be included at 0.005 to 0.085 wt %.

B: 0.002 wt % or Less, Mo: 0.01 wt % or Less, Mg: 0.005 wt % or Less, and Zr: 0.005 wt % or Less Since boron (B), molybdenum (Mo), magnesium (Mg), and zirconium (Zr) react with impurity elements to form fine sulfides, carbides, and nitrides and have an adverse effect on magnetism, their contents may be limited as described above.

The steel sheet base material 10 may further include one or more of C, N, S, Ti, Nb, and V at 0.005 wt % or less.

C: 0.005 wt % or Less

Carbon (C), when added much, expands an austenite region to increase a phase transformation section, suppresses crystal grain growth of ferrite during annealing to increase iron loss, is bonded to Ti and the like to form a carbide to deteriorate magnetism, and when processed into an electrical product as a final product and then used, increases iron loss by magnetic aging. Therefore, C may be added in the range described above. More specifically, C may be included at 0.003 wt % or less.

S: 0.005 wt % or Less

Since sulfur (S) forms a fine sulfide inside the base material to suppress crystal grain growth, thereby weakening iron loss, it is preferred to add sulfur as little as possible. When S is included in a large amount, it is bonded to Mn and the like to form a precipitate or cause high temperature brittleness during hot rolling. Therefore, S may be further included at 0.005 wt % or less. Specifically, S may be further included at 0.0030 wt % or less. More specifically, S may be further included at 0.0001 to 0.0030 wt %.

N: 0.005 wt % or Less

Nitrogen (N) is strongly bonded to Al, Ti, and the like to form a nitride and suppress crystal grain growth, and since it hinders movement of a magnetic domain when precipitated, it is preferred to contain less N. Therefore, N may be added in the range described above. More specifically, N may be included at 0.003 wt % or less.

Ti, Nb, V: 0.005 wt % or Less

Since titanium (Ti), niobium (Nb), vanadium (V) and the like are also strong carbide forming elements, it is preferred not to add them if possible, and they are included at 0.01 wt % or less, respectively.

The balance includes Fe and inevitable impurities. Since inevitable impurities are impurities incorporated in a manufacturing process of a steel making step and a manufacturing process of the electrical steel sheet and are known in the art, detailed description will be omitted. Addition of elements other than the alloy component described above in an exemplary embodiment of the present disclosure is not excluded, and various elements may be included within a range which does not impair the technical idea of the present disclosure. When an additional element is further included, it replaces Fe as the balance.

In an exemplary embodiment of the present disclosure, diffusion of Mn into the insulating coating film 20 in stress relief annealing may be suppressed by adding Sn and Sb to the steel sheet base material 10.

When the Mn component is increased too much by much Mn diffusion into the insulating coating film 20, the insulating properties of the insulating coating film may be deteriorated. In addition, a binding force between the insulating coating film and the base material may be weakened.

When a Mn concentration at a depth of 50 μm from the surface of the steel sheet base material 10 toward the inside of the base material is [Mn50] and the Mn concentration of the insulating coating film 20 is [Mn coating film], the following Formula 3 is satisfied before the stress relief annealing and the following Formula 3 is satisfied after the stress relief annealing.

$$0.01 \geq [\text{Mn coating film}]/[\text{Mn50}] \quad \text{[Formula 2]}$$

$$10 \geq [\text{Mn coating film}] \geq 1 \quad \text{[Formula 3]}$$

The stress relief annealing may be performed at a temperature of 800 °C to 900 °C under an atmosphere which includes one or more of nitrogen, hydrogen, and carbon monoxide and has a dew point of 0 °C or lower. The time may be 10 to 300 minutes.

By adding Sn and Sb to the steel sheet base material 10, the surface portion 30 is formed on the surface of the steel sheet base material 10 on which Sn, Sb, and O are concentrated from the surface of the steel sheet base material 10 toward the inside of the base material. That is, the surface portion 30 is present on an interface between the steel sheet base material 10 and the insulating coating film 20. The surface portion 30 serves to hinder diffusion of Mn from the steel sheet base material 10 into the insulating coating film 20. The surface portion 30 refers to a portion having an oxygen content of 5 wt % or more, and as oxygen is exposed in the manufacturing process, oxygen in the atmosphere penetrates into the steel sheet and is formed from the surface toward the inside.

A thickness of the surface portion 30 divided like this may be 10 to 50 nm. When the surface portion 30 is too thinly formed, it is difficult to appropriately prevent the Mn diffusion described above. When the surface portion 30 is formed too thick, magnetism may become poor. Therefore, the surface portion 30 may be present at the thickness in the range described above.

The insulating coating film 20 is positioned on the surface of the steel sheet base material 10. The insulating coating film 20 serves to allow insulation between the non-oriented electrical steel sheets, when manufacturing a product by laminating the non-oriented electrical steel sheet. The insulating coating film may be treated with an organic, inorganic, and organic and inorganic composite coating film, and may be formed by treatment with a coating agent capable of insulation.

For example, when the insulating coating film 20 is formed using a phosphate-based insulating coating film composition, the insulating coating film may include 5 to 50 wt % of P and 0.01 wt % or less of Mn. As such, the insulating coating film 20 before the stress relief annealing includes a small amount of Mn. The balance may be O. 1 to 10 wt % of Si may be further included.

The insulating coating film 20 before the stress relief annealing may satisfy the following Formula 1:

$$0.1 \geq [\text{Mn coating film}]/[\text{Mn50}] \quad \text{[Formula 2]}$$

wherein [Mn coating film] is an average Mn content (wt %) in the insulating coating film, and [Mn50] is a Mn content (wt %) at a depth of 50 μm from the interface between the steel sheet base material and the insulating coating film toward the inside of the steel sheet base material.

Meanwhile, the insulating coating film after the stress relief annealing may include 2.0 to 25.0 wt % of Mn by partial diffusion of Mn in the steel sheet base material 10. More specifically, it may include 2.0 to 17.0 wt % of Mn. Other components may be the same as those before the stress relief annealing. That is, the insulating coating film 20 after the stress relief annealing may satisfy the following Formula 3:

$$10 \geq [\text{Mn coating film}]/[\text{Mn50}] \geq 1 \qquad \text{[Formula 3]}$$

wherein [Mn coating film] is an average Mn content (wt %) in the insulating coating film.

More specifically, the value of Formula 3 may be 2.0 to 9.5. More specifically, the value of Formula 3 may be 3.0 to 9.3.

That is, the insulating coating film 20 after the stress relief annealing may include 5 to 50 wt % of P and 2.0 to 10.0 wt % of Mn. The balance may be O. 1 to 10 wt % of Si may be further included.

When an appropriate amount of Mn diffusion into the insulating coating film 20 proceeds, an inorganic material ratio in the insulating coating film is increased to improve stability at a high temperature. In this case, stability in the stress relief annealing is secured, and a binding force between the base material and the insulating coating film 20 may be maintained even thereafter. Due to the results, after the stress relief annealing, a binding force of 5B or more may be maintained as a result of a crosscut test in accordance with ASTM D3559 which is a binding force test.

An average crystal grain particle diameter before the stress relief annealing may be 60 μm or less. The average crystal grain particle diameter is small before the stress relief annealing and the mechanical strength of the steel sheet is excellent.

Meanwhile, iron loss W10/800 (W/kg) after the stress relief annealing may satisfy the following Formula 4:

$$W10/800 \leq 25 + 60 \times t \qquad \text{[Formula 4]}$$

wherein t is a thickness (mm) of the steel sheet.

In order to improve iron loss after the stress relief annealing, stress relief annealing is performed.

More specifically, W10/800≤21+60×t may be satisfied.

A method for manufacturing a non-oriented electrical steel sheet includes: hot rolling a slab to manufacture a hot rolled sheet; cold rolling the hot rolled sheet to manufacture a cold rolled sheet; and annealing the cold rolled sheet.

First, a slab is hot rolled.

Since the alloy components of the slab are as described in the alloy components of the non-oriented electrical steel sheet, redundant description will be omitted. Since the alloy components are not substantially changed in the manufacturing process of the non-oriented electrical steel sheet, the alloy components of the non-oriented electrical steel sheet and those of the slab are substantially the same.

Specifically, the slab includes, by weight: 2.0 to 6.5% of Si, 0.1 to 1.3% of Al, 0.3 to 2.0% of Mn, 0.03% or less (excluding 0%) of Sn, and 0.02% or less (excluding 0%) of Sb, with a balance of Fe and other inevitable impurities. The slab satisfies the following Formula 1:

$$0.030 \geq [\text{Sn}] + [\text{Sb}] \geq 0.005 \qquad \text{[Formula 1]}$$

wherein [Sn] and [Sb] are contents (wt %) of Sn and Sb, respectively.

Since other additional elements are described in the alloy components of the non-oriented electrical steel sheet, redundant description will be omitted.

The slab may be heated before hot rolling. Though the heating temperature of the slab is not limited, the slab may be heated to 1100 to 1250 °C.

When the slab heating temperature is too high, precipitates which harm magnetism may be dissolved again and finely precipitated after the hot rolling.

Next, the slab is hot rolled to manufacture a hot rolled sheet. The hot rolled sheet may have a thickness of 2 to 3.0 mm.

After the manufacturing of the hot rolled sheet, annealing of the hot rolled sheet may be further included. It is preferred to perform the hot rolled sheet annealing in manufacturing a high grade electrical steel sheet having no phase transformation, and the hot rolled sheet annealing is effective for improving magnetic flux density by improving the texture of a final annealed sheet.

Herein, the annealing of the hot rolled sheet may be performed at a temperature of 850 to 1200 °C. When the hot rolled sheet annealing temperature is too low, the texture does not grow or finely grows, so that it is difficult to expect an effect of increasing magnetic flux density. When the hot rolled sheet annealing temperature is too high, the magnetic properties are rather deteriorated, and rolling workability may become poor due to the deformation of a plate shape. The hot rolled sheet annealing is performed for increasing orientation favorable to magnetism, if necessary, and may be omitted.

Next, scale present on the surface of the hot rolled sheet or the annealed hot rolled sheet is removed. In an exemplary embodiment of the present disclosure, a shot ball projection amount is increased to contribute to formation of a Sn/Sb concentrated layer on the surface of the base material, which adjusts Mn diffusion into the insulating coating film.

The removing of scale includes removing scale by projecting shot balls in an amount of 15 to 35 kg/(min-$m^2$) onto the steel sheet. When the shot ball projection amount is too small, a residual oxide layer on the surface hinders formation of the Sn/Sb concentrated layer, so that it is difficult to adjust Mn diffusion. On the contrary, when the shot ball projection amount is too large, the surface of the steel sheet is much damaged, and thus, the upper limit may be appropriately adjusted. More specifically, the shot balls may be projected in an amount of 17 to 30 kg/(min-$m^2$) onto the steel sheet.

The shot balls may have an average particle size of 0.1 to 1 mm and may be projected for 1 to 60 seconds. More specifically, the shot balls may have an average particle size of 0.3 to 0.8 mm and may be projected for 5 to 30 seconds. The average particle size and the projection time of the shot balls also affect diffusion of Mn into the insulating coating film.

Though the material of the shot balls is not limited, a Fe-based alloy may be used.

Next, the hot rolled sheet is cold rolled to manufacture a cold rolled sheet. The cold rolling is final rolling to a thickness of 0.15 mm to 0.65 mm. If necessary, second cold rolling may be performed after the first cold rolling and intermediate annealing, and a final reduction rate may be in a range of 50 to 95%.

Next, the cold rolled sheet is annealed. Cold rolled sheet annealing is performed in a range of 700 to 1100 °C for 10 to 1000 seconds so that the crystal grain size on the steel sheet cross-section is 20 to 150 μm. When the cold rolled sheet annealing temperature is too low, crystal grains are small, so that iron loss may be deteriorated. When the temperature is too high, crystal grains are coarsened and abnormal vortex loss is increased to increase total iron loss. More specifically, the annealing may be performed in a range of 900 to 1050 °C.

After the cold rolled sheet annealing, all (99% or more) of the texture worked by the cold rolling of the steel sheet may be recrystallized.

During the cold rolled sheet annealing, a heating rate to cracks may be 30 to 150 °C/sec. When the heating rate is appropriately adjusted, an oxide layer is thinly and densely formed, so that Mn diffusion may be prevented.

The annealing of the cold rolled sheet may be performed under an atmosphere which includes 40 vol % or less of hydrogen ($H_2$) and 60 vol % or more of nitrogen and has a dew point of 0 to −40 °C. Specifically, the annealing may be performed under an atmosphere including 0 to 10 vol % of hydrogen and 90 to 100 vol % of nitrogen. When the annealing atmosphere is appropriately adjusted, the oxide layer is thinly and densely formed, so that Mn diffusion may be prevented.

Next, the insulating coating film may be formed after the cold rolled sheet annealing. The insulating coating film may be treated with organic, inorganic, and organic and inorganic composite coating films, and may also be treated with other coating agent capable of insulation. For example, it may be formed by applying an insulating coating film forming composition including 40 to 70 wt % of a metal phosphate and 0.5 to 10 wt % of silica. The insulating coating film include 5 wt % or more of P, and the steel sheet base material includes less than 5 wt % of P, so that they are divided.

Next, stress relief annealing is performed. The stress relief annealing is performed at a temperature of 700 °C to 850 °C for 10 to 300 minutes.

A motor core according to an exemplary embodiment of the present disclosure includes a rotor formed by laminating a plurality of non-oriented electrical steel sheets and a stator formed by laminating a plurality of non-oriented electrical steel sheets.

The non-oriented electrical steel sheet in the rotor includes, by weight: 2.0 to 6.5% of Si, 0.1 to 1.3% of Al, 0.3 to 2.0% of Mn, 0.03% or less (excluding 0%) of Sn, and 0.02% or less (excluding 0%) of Sb, with a balance of Fe and other inevitable impurities, and satisfies the following Formulae 1 and 2.

The non-oriented electrical steel sheet in the stator includes, by weight: 2.0 to 6.5% of Si, 0.1 to 1.3% of Al, 0.3 to 2.0% of Mn, 0.03% or less (excluding 0%) of Sn, and 0.02% or less (excluding 0%) of Sb, with a balance of Fe and other inevitable impurities, and satisfies the following Formulae 1 and 3.

$$0.030 \geq [Sn] + [Sb] \geq 0.005 \quad \text{[Formula 1]}$$

$$0.1 \geq [Mn\ coating\ film]/[Mn50] \quad \text{[Formula 2]}$$

$$10 \geq [Mn\ coating\ film]/[Mn50] \geq 1 \quad \text{[Formula 3]}$$

wherein [Sn] and [Sb] are contents of Sn and Sb, respectively, [Mn coating film] is an average Mn content (wt %) in the insulating coating film, and [Mn50] is a Mn content (wt %) at a depth of 50 μm from an interface between the steel sheet base material and the insulating coating film toward the inside of the steel sheet base material.

In the case of the rotator, the mechanical properties is more important than the magnetic properties. Therefore, an SPA process which may deteriorate mechanical properties may be omitted. Thus, the characteristics of the non-oriented electrical steel sheet before SRA are derived. Steel components, Mn diffusion, and Mn in the insulating coating film are described in relation to the non-oriented electrical steel sheet described above, redundant description will be omitted.

In the case of the stator, the magnetic properties are more important than the mechanical properties, and improvement of magnetism may be promoted by SRA after blanking and lamination. Therefore, the characteristics of the non-oriented electrical steel sheet are shown in the stator after SRA. Since the steel components of the non-oriented electrical steel sheet, the Mn diffusion, and Mn in the insulating coating film are described in relation to the non-oriented electrical steel sheet described above, redundant description will be omitted.

Meanwhile, the stator and the rotor are roughly blanked into a donut or disk shape. When the stator and the rotor are manufactured by blanking from a separate coil of the non-oriented electrical steel sheet, respectively, the blanked remaining part are scrap treated, which leads to rising process costs and waste of resources and energy. When the stator and the rotor are manufactured by blanking from the same coil, the scrap treated part may be minimized.

Thus, the non-oriented electrical steel sheet included in the stator and the rotor in an exemplary embodiment of the present disclosure may be a non-oriented electrical steel sheet derived from the same coil. The meaning of being derived from the same coil in an exemplary embodiment of the present disclosure is that steel components such as Si, Al, and Mn in the non-oriented electrical steel sheet included in the stator and the rotor are substantially the same. Specifically, it means that a difference in Si, Al, and Mn contents between the stator and the rotor is 0.20 wt % or less, respectively. More specifically, it means that a difference in Si, Al, and Mn contents between the stator and the rotor is 0.10 wt % or less, respectively. More specifically, it means that a difference in Si, Al, and Mn contents between the stator and the rotor is 0.05 wt % or less, respectively. More specifically, it means that a difference in Si, Al, and Mn contents between the stator and the rotor is 0.01 wt % or less, respectively. In the case of Sn and Sb, a content difference may be 0.01 wt % or less, respectively. More specifically, it may be 0.005 wt % or less. More specifically, it may be 0.001 wt % or less. The components of the insulating coating films of the stator and the rotor may also be substantially the same.

Hereinafter, the present disclosure will be described in more detail by the examples. However, the examples are only for illustrating the present disclosure, and the present disclosure is not limited thereto.

Example 1

Slabs including the components of the following Table 1 and Table 2 with a balance of Fe and other inevitable impurities were manufactured. The slabs were heated to 1150 °C and hot finish rolled at 850 °C to manufacture hot rolled sheets having a sheet thickness of 2.3 mm. The hot rolled sheets were annealed at 1100 °C for 4 minutes, and then blasted in the shot ball projection amount summarized in the following Table 3 to remove scale. Thereafter, cold rolling was performed to set the sheet thickness to 0.27 mm, heating was performed at 100 °C/sec, and final annealing was performed at 970 °C for 5 minutes under a nitrogen atmosphere. The insulating coating film was formed at a thickness of 0.5 μm using an insulating coating film composition including 50 wt % of an Al phosphate and 5 wt % of silica.

Thereafter, annealing was performed at a temperature of 825 °C for 1 hour for stress removal. Thus, a finally stress-removed non-oriented electrical steel sheets were manufactured. Components in a depth direction were measured 3 times with a glow discharge spectrometer, and average values of the Mn coating film and Mn50 are shown in the following Table 3 according to the experimental conditions.

Adhesiveness was measured by a Crosscut Test (ASTM D3359) method.

TABLE 1

| (wt %) | Si | Al | Mn | Sn | Sb | Sn + Sb |
|---|---|---|---|---|---|---|
| 1 | 2.0 | 1.1 | 0.6 | 0.01 | 0.005 | 0.015 |
| 2 | 2.8 | 0.9 | 0.9 | 0.01 | 0.004 | 0.014 |
| 3 | 3.1 | 0.7 | 1.2 | 0.012 | 0.016 | 0.028 |
| 4 | 3.3 | 0.7 | 1.2 | 0.012 | 0.016 | 0.028 |
| 5 | 4.0 | 0.3 | 1.8 | 0.012 | 0.014 | 0.026 |
| 6 | 4.7 | 0.1 | 2 | 0.025 | 0.003 | 0.028 |
| 7 | 5.4 | 1.2 | 1.7 | 0.005 | 0.02 | 0.025 |
| 8 | 6.0 | 0.8 | 1.1 | 0.005 | 0.013 | 0.018 |
| 9 | 1.8 | 1.3 | 0.3 | 0.01 | 0.006 | 0.016 |
| 10 | 7.0 | 0.4 | 0.5 | 0.01 | 0.01 | 0.02 |
| 11 | 3.1 | 0.08 | 1.5 | 0.02 | 0.05 | 0.07 |
| 12 | 3.9 | 1.5 | 1.8 | 0.02 | 0.04 | 0.06 |
| 13 | 3.2 | 0.6 | 0.2 | 0.02 | 0.04 | 0.06 |
| 14 | 3.8 | 0.9 | 2.3 | 0.02 | 0.06 | 0.08 |
| 15 | 3.3 | 0.7 | 1.3 | — | 0.02 | 0.02 |
| 16 | 3.4 | 0.8 | 1.1 | — | 0.015 | 0.015 |
| 17 | 3.3 | 0.7 | 1.3 | 0.02 | — | 0.02 |
| 18 | 3.4 | 0.8 | 1.1 | 0.03 | — | 0.03 |
| 19 | 3.3 | 0.7 | 1.3 | 0.002 | 0.002 | 0.004 |
| 20 | 3.4 | 0.8 | 1.1 | 0.003 | 0.001 | 0.004 |
| 21 | 3.3 | 0.7 | 1.3 | 0.02 | 0.02 | 0.04 |
| 22 | 3.4 | 0.8 | 1.1 | 0.03 | 0.01 | 0.04 |
| 23 | 2.0 | 1.1 | 0.6 | 0.012 | 0.014 | 0.026 |
| 24 | 2.5 | 0.9 | 0.9 | 0.012 | 0.014 | 0.026 |
| 25 | 3.0 | 0.7 | 1.2 | 0.012 | 0.014 | 0.026 |
| 26 | 3.5 | 0.5 | 1.5 | 0.012 | 0.014 | 0.026 |
| 27 | 5.0 | 1.2 | 1.7 | 0.025 | 0.003 | 0.028 |
| 28 | 5.5 | 1.0 | 1.4 | 0.025 | 0.003 | 0.028 |

TABLE 2

| (wt %) | C | N | S | Ti | Nb | V |
|---|---|---|---|---|---|---|
| 1 | 0.002 | 0.003 | 0.001 | 0.004 | 0.001 | 0.005 |
| 2 | 0.003 | 0.001 | 0.003 | 0.003 | 0.005 | 0.003 |
| 3 | 0.001 | 0.005 | 0.003 | 0.003 | 0.005 | 0.003 |
| 4 | 0.001 | 0.005 | 0.003 | 0.003 | 0.005 | 0.003 |
| 5 | 0.003 | 0.001 | 0.005 | 0.002 | 0.003 | 0.002 |
| 6 | 0.004 | 0.002 | 0.005 | 0.002 | 0.003 | 0.001 |
| 7 | 0.001 | 0.004 | 0.005 | 0.001 | 0.001 | 0.001 |
| 8 | 0.003 | 0.001 | 0.002 | 0.005 | 0.003 | 0.002 |
| 9 | 0.001 | 0.005 | 0.001 | 0.004 | 0.001 | 0.005 |
| 10 | 0.005 | 0.003 | 0.004 | 0.005 | 0.005 | 0.003 |
| 11 | 0.002 | 0.003 | 0.003 | 0.003 | 0.005 | 0.002 |
| 12 | 0.003 | 0.001 | 0.005 | 0.002 | 0.003 | 0.002 |
| 13 | 0.003 | 0.001 | 0.005 | 0.002 | 0.003 | 0.002 |
| 14 | 0.001 | 0.005 | 0.003 | 0.003 | 0.005 | 0.003 |
| 15 | 0.001 | 0.005 | 0.003 | 0.003 | 0.005 | 0.003 |
| 16 | 0.004 | 0.005 | 0.004 | 0.005 | 0.004 | 0.003 |
| 17 | 0.001 | 0.005 | 0.003 | 0.003 | 0.005 | 0.003 |
| 18 | 0.004 | 0.005 | 0.004 | 0.005 | 0.004 | 0.003 |
| 19 | 0.001 | 0.005 | 0.003 | 0.003 | 0.005 | 0.003 |
| 20 | 0.004 | 0.005 | 0.004 | 0.005 | 0.004 | 0.003 |
| 21 | 0.001 | 0.005 | 0.003 | 0.003 | 0.005 | 0.003 |
| 22 | 0.004 | 0.005 | 0.004 | 0.005 | 0.004 | 0.003 |
| 23 | 0.002 | 0.003 | 0.001 | 0.004 | 0.001 | 0.005 |

TABLE 2-continued

| (wt %) | C | N | S | Ti | Nb | V |
|---|---|---|---|---|---|---|
| 24 | 0.003 | 0.001 | 0.003 | 0.003 | 0.005 | 0.003 |
| 25 | 0.001 | 0.005 | 0.003 | 0.003 | 0.005 | 0.003 |
| 26 | 0.002 | 0.003 | 0.003 | 0.003 | 0.005 | 0.002 |
| 27 | 0.001 | 0.004 | 0.005 | 0.001 | 0.001 | 0.001 |
| 28 | 0.002 | 0.005 | 0.002 | 0.001 | 0.002 | 0.002 |

TABLE 3

| | Shot ball projection amount (kg/min · $m^2$) | Shot ball projection time (sec) | Surface portion thickness (nm) | Sn + Sb content (%) in surface portion | Before stress relief annealing Mn coating film | Before stress relief annealing Mn50 |
|---|---|---|---|---|---|---|
| 1 | 25 | 55 | 22 | 2.8 | 0.001 | 0.63 |
| 2 | 30 | 50 | 26 | 2.6 | 0.001 | 0.93 |
| 3 | 35 | 45 | 27 | 5.4 | 0.001 | 1.16 |
| 4 | 35 | 45 | 27 | 5.4 | 0.001 | 1.18 |
| 5 | 31 | 35 | 24 | 5.0 | 0.001 | 1.84 |
| 6 | 29 | 30 | 22 | 5.4 | 0.001 | 1.99 |
| 7 | 27 | 25 | 21 | 4.8 | 0.001 | 1.68 |
| 8 | 23 | 15 | 19 | 3.4 | 0.001 | 1.08 |
| 9 | 20 | 60 | 17 | 3.0 | 0.001 | 0.34 |
| 10 | 19 | 5 | 15 | 3.8 | 0.001 | 0.53 |
| 11 | 17 | 3 | 7 | 13.8 | 0.001 | 1.54 |
| 12 | 15 | 1 | 7 | 11.8 | 0.001 | 1.83 |
| 13 | 18 | 4 | 9 | 11.8 | 0.001 | 0.17 |
| 14 | 24 | 12 | 8 | 15.8 | 0.001 | 2.25 |
| 15 | 27 | 16 | 22 | 3.8 | 0.001 | 1.33 |
| 16 | 30 | 20 | 26 | 2.8 | 0.001 | 1.05 |
| 17 | 27 | 16 | 22 | 3.8 | 0.001 | 1.29 |
| 18 | 30 | 20 | 22 | 5.8 | 0.001 | 1.13 |
| 19 | 27 | 16 | 26 | 0.6 | 0.001 | 1.3 |
| 20 | 30 | 20 | 29 | 0.6 | 0.001 | 1.1 |
| 21 | 27 | 16 | 18 | 7.8 | 0.001 | 1.31 |
| 22 | 30 | 20 | 20 | 7.8 | 0.001 | 1.09 |
| 23 | 13 | 24 | 10 | 5.0 | 0.001 | 0.55 |
| 24 | 11 | 28 | 8 | 5.0 | 0.001 | 0.9 |
| 25 | 38 | 32 | 30 | 5.0 | 0.001 | 1.21 |
| 26 | 40 | 36 | 31 | 5.0 | 0.001 | 1.48 |
| 27 | 30 | 0.5 | 38 | 5.4 | 0.001 | 1.71 |
| 28 | 35 | 70 | 27 | 5.4 | 0.001 | 1.36 |

TABLE 4

| | After stress relief annealing Mn coating film | Mn50 | [Mn coating film]/[Mn50] | Adhesiveness | W10/800 |
|---|---|---|---|---|---|
| 1 | 2 | 0.61 | 3.3 | 5B | 36.6 |
| 2 | 5.8 | 0.93 | 6.3 | 5B | 34.3 |
| 3 | 11 | 1.2 | 9.2 | 5B | 33.7 |
| 4 | 9.7 | 1.19 | 8.2 | 5B | 33.3 |
| 5 | 13.2 | 1.79 | 7.4 | 5B | 32.0 |
| 6 | 16.9 | 1.95 | 8.7 | 5B | 31.1 |
| 7 | 9.6 | 1.69 | 5.7 | 5B | 28.9 |
| 8 | 6 | 1.08 | 5.6 | 5B | 29.1 |
| 9 | 3.8 | 0.32 | 12.1 | 4B | 41.2 |
| 10 | 0.4 | 0.49 | 0.9 | 4B | 28.9 |
| 11 | 0.76 | 1.52 | 0.5 | 4B | 35.1 |
| 12 | 1.7 | 1.79 | 0.9 | 4B | 30.1 |
| 13 | 0.1 | 0.17 | 0.7 | 4B | 35.3 |
| 14 | 2.11 | 2.31 | 0.9 | 4B | 30.8 |
| 15 | 14.7 | 1.34 | 11 | 4B | 33.1 |
| 16 | 13 | 1.11 | 11.8 | 4B | 32.9 |
| 17 | 12.9 | 1.27 | 10.2 | 4B | 33.1 |
| 18 | 11.5 | 1.08 | 10.7 | 4B | 32.9 |
| 19 | 17.5 | 1.33 | 13.2 | 4B | 33.1 |
| 20 | 13.4 | 1.14 | 11.8 | 4B | 32.9 |

TABLE 4-continued

| | After stress relief annealing | | | | |
|---|---|---|---|---|---|
| | Mn coating film | Mn50 | [Mn coating film]/ [Mn50] | Adhesiveness | W10/800 |
| 21 | 0.7 | 1.33 | 0.6 | 4B | 33.1 |
| 22 | 0.7 | 1.06 | 0.7 | 4B | 32.9 |
| 23 | 0.3 | 0.56 | 0.7 | 4B | 36.6 |
| 24 | 0.8 | 0.92 | 0.9 | 4B | 35.2 |
| 25 | 14.1 | 1.23 | 11.5 | 4B | 34.0 |
| 26 | 22 | 1.45 | 15.2 | 4B | 32.9 |
| 27 | 2.6 | 1.68 | 1.6 | 5B | 37.5 |
| 28 | 12.9 | 1.35 | 9.6 | 5B | 37.3 |

As shown in Tables 1 to 4, in the example in which appropriate amounts of Sn and Sb were included and the shot ball projection amount was increased to prevent Mn diffusion, after performing stress relief annealing, it was confirmed that the Mn component of the insulating coating film and the Mn content at a depth of 50 μm toward the inside of the steel sheet base material were appropriately adjusted. However, in Nos. 15 to 20 in which the amounts of Sn and Sb were small, it was confirmed that Mn diffusion was not prevented, so that a large amount of Mn was present on the insulating coating film, and in Nos. 11 to 14, 21, and 22, a small amount of Mn was present on the insulating coating film.

Meanwhile, in Nos. 23 to 26 in which Sn and Sb were included in appropriate amounts, but the projection conditions were not satisfied, it was confirmed that Mn was included in excess or insufficiently.

The present disclosure is not limited by the above exemplary embodiments and may be manufactured in various forms different from each other, and it may be understood that a person with ordinary skill in the art to which the present disclosure pertains may carry out the present disclosure in another specific form without modifying the technical idea or essential feature of the present disclosure. Therefore, it should be understood that the exemplary embodiments described above are illustrative and are not restrictive in all aspects.

| [Description of symbols] |
|---|
| 100: non-oriented electrical steel sheet,<br>10: steel sheet base material,<br>20: insulating coating film,<br>30: oxide layer |

The invention claimed is:

1. A non-oriented electrical steel sheet comprising:

a steel sheet base material which includes, by weight: 2.0 to 6.5% of Si, 0.1 to 1.3% of Al, 0.3 to 2.0% of Mn, more than 0 to 0.03% or less of Sn, and more than 0 to 0.02% or less of Sb, with a balance of Fe and other inevitable impurities and satisfies the following Formula 1, and an insulating coating film positioned on the steel sheet base material, wherein the non-oriented electrical steel sheet satisfies the following Formula 2 before stress relief annealing and satisfies the following Formula 3 after stress relief annealing:

$$0.030 \geq [Sn] + [Sb] \geq 0.005 \quad \text{[Formula 1]}$$

$$0.1 \geq [\text{Mn coating film}]/[\text{Mn50}] \quad \text{[Formula 2]}$$

$$10 \geq [\text{Mn coating film}]/[\text{Mn50}] \geq 1 \quad \text{[Formula 3]}$$

wherein [Sn] and [Sb] are contents, in wt %, of Sn and Sb, respectively, [Mn coating film] is an average Mn content, in wt %, in the insulating coating film, and [Mn50] is a Mn content, in wt %, at a depth of 50 μm from an interface between the steel sheet base material and the insulating coating film toward an inside of the steel sheet base material.

2. The non-oriented electrical steel sheet of claim 1, wherein:

the steel sheet base material further includes 0.005 wt % or less of one or more of C, N, S, Ti, Nb, and V.

3. The non-oriented electrical steel sheet of claim 1, wherein:

the steel sheet base material further includes one or more of 0.01 to 0.2 wt % of Cu, 0.100 wt % or less of P, 0.002 wt % or less of B, 0.01 wt % or less of Mo, 0.005 wt % or less of Mg, and 0.005 wt % or less of Zr.

4. The non-oriented electrical steel sheet of claim 1, wherein:

an average crystal grain particle diameter before the stress relief annealing is 60 μm or less.

5. The non-oriented electrical steel sheet of claim 1, wherein:

iron loss W10/800, in W/kg, after the stress relief annealing satisfies the following Formula 4:

$$W10/800 \leq 25 + 60 \times t \quad \text{[Formula 4]}$$

wherein t is a thickness, in mm, of the steel sheet.

6. The non-oriented electrical steel sheet of claim 1, wherein:

the stress relief annealing is performed at a temperature of 800 °C to 900 °C under an atmosphere which includes one or more of nitrogen, hydrogen, and carbon monoxide and has a dew point of 0 °C or lower.

7. A method for manufacturing a non-oriented electrical steel sheet, the method comprising:

hot rolling a slab which includes, by weight: 2.0 to 6.5% of Si, 0.1 to 1.3% of Al, 0.3 to 2.0% of Mn, more than 0 to 0.03% or less of Sn, and more than 0 to 0.02% or less of Sb, with a balance of Fe and other inevitable impurities and satisfies the following Formula 1, thereby manufacturing a hot rolled sheet;

removing scale present on a surface of the hot rolled sheet;

cold rolling the descaled hot rolled sheet to manufacture a cold rolled sheet; and annealing the cold rolled sheet, wherein the removing of scale includes projecting shot balls in an amount of 15 to 35 kg per minute per $m^2$ onto the steel sheet to remove scale:

$$0.030 \geq [Sn] + [Sb] \geq 0.005 \quad \text{[Formula 1]}$$

wherein [Sn] and [Sb] are contents, in wt %, of Sn and Sb, respectively.

8. The method for manufacturing a non-oriented electrical steel sheet of claim 7, wherein:

the shot balls have an average particle size of 0.1 to 1 mm and are projected for 1 to 60 seconds.

9. The method for manufacturing a non-oriented electrical steel sheet of claim 7, wherein:

a material of the shot balls is an Fe-based alloy.

10. The method for manufacturing a non-oriented electrical steel sheet of claim 7, wherein:

the annealing of the cold rolled sheet is performed at a temperature of 700 to 1100 °C for 10 to 1000 seconds.

11. The method for manufacturing a non-oriented electrical steel sheet of claim 7, further comprising:

annealing the hot rolled sheet, before the removing of scale.

12. The method for manufacturing a non-oriented electrical steel sheet of claim 7, further comprising:

performing stress relief annealing, after the annealing of the cold rolled sheet.

13. A motor core comprising: a rotor formed by laminating a plurality of non-oriented electrical steel sheets and a stator formed by laminating a plurality of non-oriented electrical steel sheets, wherein the non-oriented electrical steel sheet in the rotor includes, by weight: 2.0 to 6.5% of Si, 0.1 to 1.3% of Al, 0.3 to 2.0% of Mn, more than 0 to 0.03% or less of Sn, and more than 0 to 0.02% or less of Sb, with a balance of Fe and other inevitable impurities, and satisfies the following Formulae 1 and 2, and the non-oriented electrical steel sheet in the stator includes, by weight: 2.0 to 6.5% of Si, 0.1 to 1.3% of Al, 0.3 to 2.0% of Mn, more than 0 to 0.03% or less of Sn, and more than 0 to 0.02% or less of Sb, with a balance of Fe and other inevitable impurities, and satisfies the following Formulae 1 to 3:

$$0.030 \geq [Sn] + [Sb] \geq 0.005 \quad \text{[Formula 1]}$$

$$0.1 \geq [\text{Mn coating film}]/[\text{Mn50}] \quad \text{[Formula 2]}$$

$$10 \geq [\text{Mn coating film}]/[\text{Mn50}] \geq 1 \quad \text{[Formula 3]}$$

wherein [Sn] and [Sb] are contents of Sn and Sb, respectively, [Mn coating film] is an average Mn content, in wt %, in the insulating coating film, and [Mn50] is a Mn content, in wt %, at a depth of 50 μm from the interface between the steel sheet base material and the insulating coating film toward an inside of the steel sheet base material.

14. The motor core of claim 13, wherein:

the non-oriented electrical steel sheets included in the stator and the rotor are derived from the same coil.

15. The motor core of claim 13, wherein:

a difference in contents of Si, Al, and Mn between the non-oriented electrical steel sheets included in the stator and the rotor is 0.20 wt % or less.

* * * * *